United States Patent
Maytal et al.

(10) Patent No.: US 9,166,890 B2
(45) Date of Patent: Oct. 20, 2015

(54) MAINTAINING APPLICATION PERFORMANCES UPON TRANSFER BETWEEN CLOUD SERVICES

(75) Inventors: Benjamin Maytal, Israel (IL); Noam Meir, Israel (IL)

(73) Assignee: Empire Technology Development LLC, Wilmington, DE (US)

( * ) Notice: Subject to any disclaimer, the term of this patent is extended or adjusted under 35 U.S.C. 154(b) by 451 days.

(21) Appl. No.: 13/634,335

(22) PCT Filed: Feb. 6, 2012

(86) PCT No.: PCT/US2012/023995
§ 371 (c)(1),
(2), (4) Date: Sep. 12, 2012

(87) PCT Pub. No.: WO2013/119200
PCT Pub. Date: Aug. 15, 2013

(65) Prior Publication Data
US 2013/0332588 A1    Dec. 12, 2013

(51) Int. Cl.
*G06F 15/173* (2006.01)
*H04L 12/24* (2006.01)
*G06F 9/48* (2006.01)
*G06F 9/50* (2006.01)
*G06F 11/34* (2006.01)

(52) U.S. Cl.
CPC .............. *H04L 41/18* (2013.01); *G06F 9/4856* (2013.01); *G06F 9/5072* (2013.01); *G06F 11/3428* (2013.01); *G06F 11/3447* (2013.01); *G06F 2209/508* (2013.01)

(58) Field of Classification Search
CPC . G06F 3/0647; G06F 9/4862; G06F 11/3428; G06F 9/50; G06F 11/1464; H04L 41/18
See application file for complete search history.

(56) References Cited

U.S. PATENT DOCUMENTS

| 8,289,966 | B1 * | 10/2012 | Fricke et al. | 370/392 |
| 2002/0072358 | A1 * | 6/2002 | Schneider et al. | 455/423 |
| 2009/0210527 | A1 * | 8/2009 | Kawato | 709/224 |

(Continued)

OTHER PUBLICATIONS

"A Successful Data Center Migration," Accessed at http://www.infosys.com/consulting/information-management/white-papers/Documents/data-center-migration.pdf, pp. 44 (Apr. 2009).

(Continued)

*Primary Examiner* — Joshua Joo
*Assistant Examiner* — Younes Naji
(74) *Attorney, Agent, or Firm* — Turk IP Law, LLC

(57) ABSTRACT

Technologies are presented for tracking of used resources and ensuring a similar level of computing resources to be provided at a new cloud-based service provider for a migrating application, even if the new service provider has a different mix of resources. Computing resources in use by the migrating application and a level of used computing power may be identified. Each of the computing resources may be assigned a score according to an associated service level. An overall score generated as a weighted combination of the individual scores according to their influence on application processing and networking status may be used for comparison of service levels between an existing service provider and the new service provider to ensure the migrating application receives a similar performance level. Additionally, the individual and overall scores may be employed by the new service provider to properly allocate its resources to provide similar performance level.

20 Claims, 7 Drawing Sheets

(56) References Cited

U.S. PATENT DOCUMENTS

| | | | |
|---|---|---|---|
| 2010/0125473 | A1 | 5/2010 | Tung et al. |
| 2010/0250746 | A1* | 9/2010 | Murase .......................... 709/226 |
| 2010/0318999 | A1 | 12/2010 | Zhao et al. |
| 2011/0022812 | A1* | 1/2011 | van der Linden et al. .... 711/163 |
| 2011/0213875 | A1 | 9/2011 | Ferris et al. |
| 2012/0137003 | A1* | 5/2012 | Ferris et al. ................... 709/226 |
| 2012/0151057 | A1* | 6/2012 | Paredes et al. ................ 709/225 |

OTHER PUBLICATIONS

International Preliminary Report on Patentability for PCT/US2012/023995 filed Feb. 6, 2012, mailed on Aug. 21, 2014, issued Aug. 12, 2014.

International Search Report and Written Opinion for PCT/US2012/023995 Filed Feb. 6, 2012, mailed on May 23, 2012.

Maffioletti et al., UbiDev: An Homogeneous Environment for Ubiquitous Interactive Devices, DIUF—Department of Informatics University of FribourgChemin du Mus'ee 31700 Fribourg, Switzerland, Aug. 2002.

Ruan et al., Cloud forensics: An overview, Centre for Cybercrime Investigation, University College Dublin, * IBM Ireland Ltd, Advances in Digital Forensics, vol. 7 by Springer, Jan. 30, 2011.

Armbrust et al., Above the Clouds: A Berkeley View of Cloud Computing, Electrical Engineering and Computer Sciences, University of California at Berkeley, Technical Report No. UCB/EECS-2009-28.

Xiong et al., Service Performance and Analysis in Cloud Computing, Department of Computer Science North Carolina State University Raleigh, NC 27695-7534.

Rodirigo N. et al., CloudSim: a toolkit for modeling and simulation of cloud computing environments and evaluation of resource provisioning algorithms, Softw. Pract. Exper. 2011; 41:23-50, Published online Aug. 24, 2010 in Wiley Online Library (wileyonlinelibrary.com). DOI: 10.1002/spe.995.

Spirent Cloud and Data Center Test Solutions Testcenter, http://www.spirent.com/~/media/Brochures/Spirent TestCenter Cloud and DataCenter B rochure.ashx.

Armburst et al., "A View of Cloud Computing", Clearing the clouds away from the true potential and obstacles posed by this computing capability, Communications of the ACM | April 2010 | vol. 53 | No. 4.

* cited by examiner

MAINTAINING APPLICATION PERFORMANCES UPON TRANSFER BETWEEN CLOUD SERVICES

CROSS-REFERENCE TO RELATED APPLICATIONS

This Application is the National Stage filing under 35 U.S.C. §371 of PCT Application Ser. No. PCT/US12/23995 filed on Feb. 6, 2012. The PCT Application is herein incorporated by reference in its entirety.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. Depending on customer needs, datacenter capabilities, and associated costs, services provided to customers may be defined by Service Level Agreements (SLAs) describing aspects such as server latency, storage limits or quotas, processing power, scalability factors, backup guarantees, uptime guarantees, resource usage reporting, and similar ones.

The success of cloud-based services means that more and more applications are being moved to the cloud. Customers (or tenants) typically prefer to have the option of moving applications from one service provider to another while maintaining service parameters like performance, cost, liability, and similar ones. Service providers may prefer to have the option of moving an application from one site to another while maintaining performance and service level of the application.

Core service parameters such as server processing, memory, and networking may be implemented in a wide variety of ways by different service providers. Indeed, it is unlikely that the computing environment of one service provider may be a copy of the environment of another service provider. While measurement of parameters such as the application response time at an original service provider may be a straight forward process, it does not provide any guidance to a new service provider on how to plan their system resource allocation for a migrating application.

SUMMARY

The present disclosure generally describes technologies for enabling a cloud server to maintain application performances upon transfer between cloud services with equivalent or different resource mixes.

According to some examples, a method for maintaining application performances upon transfer between cloud computing environments may include determining a plurality of performance metrics associated with a customer application in a source cloud computing environment; computing a plurality of performance parameters based on the performance metrics associated with the customer application in the source cloud computing environment; combining the plurality of performance parameters to a source Cloud Computing Applicability Score (CCAS) in a weighted manner; and adapting a target cloud computing environment for the customer application based on the source CCAS.

According to other examples, a computing device for maintaining application performances upon transfer between cloud computing environments may include a memory configured to store instructions and a processing unit configured to execute a migration module in conjunction with the instructions. The migration module may determine a plurality of performance metrics associated with a customer application in a source cloud computing environment; compute a plurality of performance parameters based on the performance metrics associated with the customer application in the source cloud computing environment; combine the plurality of performance parameters to a source Cloud Computing Applicability Score (CCAS) in a weighted manner; and adapt a target cloud computing environment for the customer application based on the source CCAS.

According to further examples, a computer-readable storage medium may have instructions stored thereon for maintaining application performances upon transfer between cloud computing environments. The instructions may include determining a plurality of performance metrics associated with a customer application in a source cloud computing environment; computing a plurality of performance parameters based on the performance metrics associated with the customer application in the source cloud computing environment; combining the plurality of performance parameters to a source Cloud Computing Applicability Score (CCAS) in a weighted manner; and adapting a target cloud computing environment for the customer application based on the source CCAS.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
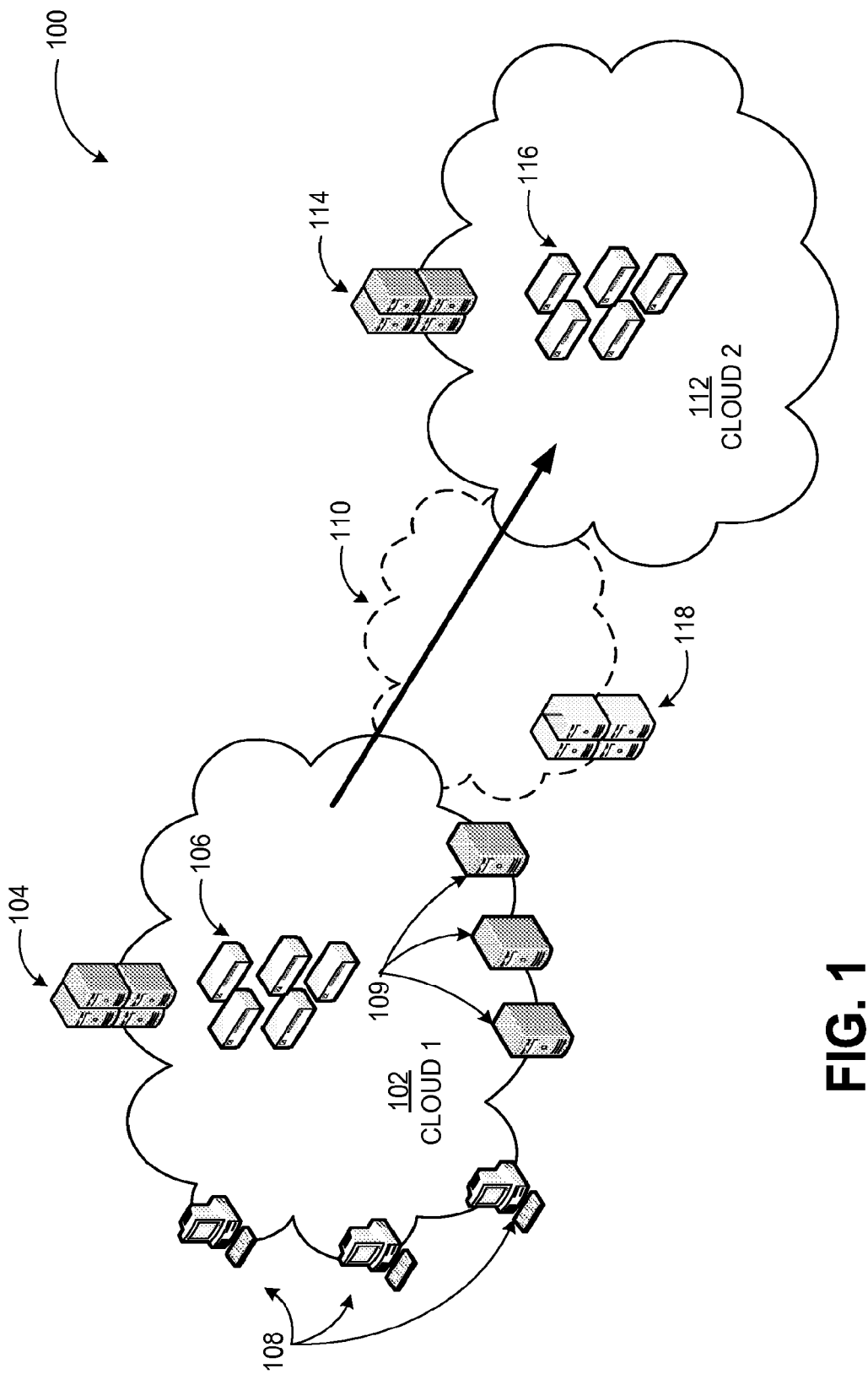
FIG. 1 illustrates an example system, where maintenance of application performances upon transfer between cloud computing environments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to maintaining application performances upon transfer between cloud services.

Briefly stated, technologies are presented for tracking of used resources and ensuring a similar level of overall computing resources to be provided at a new cloud-based service provider for a migrating application, even if the new service provider has a different mix of resources. Computing resources in use by the migrating application and a level of used or consumed computing power may be identified. Each of the computing resources may be assigned a score according to an associated service level. An overall score generated, for example, as a weighted combination of the individual scores according to their influence on application processing and networking status may be used for comparison of service levels between an existing service provider and the new service provider to ensure the migrating application receives a similar performance level. Additionally, the individual and overall scores may be employed by the new service provider to properly allocate its resources to provide similar performance level.

FIG. 1 illustrates an example system, where maintenance of application performances upon transfer between cloud computing environments may be implemented, arranged in accordance with at least some embodiments described herein.

As shown in a diagram 100, a service provider 102 (cloud 1) may host services such as various applications, data storage, data processing, or comparable ones for individual or enterprise customers 108 and 109. The service provider 102 may include one or more datacenters providing the services and employ one or more servers 104 and/or one or more special purpose devices 106 such as firewalls, routers, and so on. To provide services to its customers, the service provider 102 may employ multiple servers, special purpose devices, physical or virtual data stores, etc. Thus, an application hosted or data stored by the service provider 102 for a customer may involve a complex architecture of hardware and software components. The service level provided to the customer (owner of the hosted application or data) may be determined based on a number of service parameters such as server processing, memory, and networking, which may be implemented in a particular way by the service provider 102.

Cloud-based service providers may have disparate architectures and provide similar services but with distinct parameters. For example, data storage capacity, processing capacity, server latency, and similar aspects may differ from cloud to cloud. Furthermore, the service parameters may vary depending on the provided service. To reduce the burden of comparing clouds and ensure similar levels of performance can be provided by different service providers to a migrating application, a weighted score based system may be employed according to some example embodiments.

In the diagram 100, the service provider 102 (cloud 1) may be a source cloud and a service provider 112 (cloud 2) may be a target cloud in a migration process. Similar to the service provider 102, the service provider 112 may also employ one or more servers 114 and one or more special purpose devices 116 to provide its services. Performance level determination and scoring may be managed and performed by one of the servers 104 of the service provider 102, one of the servers 114 of the service provider 112, or by a third party service executed on one or more servers 118 of another cloud 110.

Figure 2:
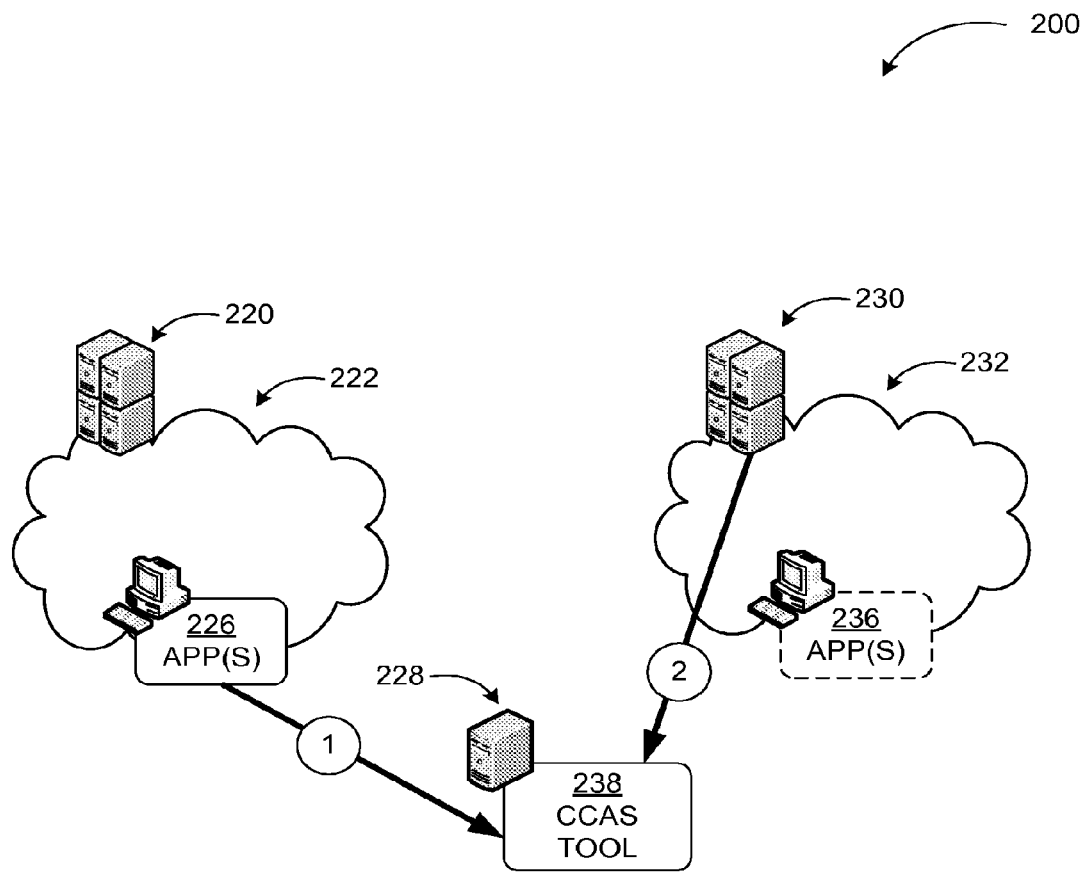
FIG. 2 illustrates one example of maintaining application performances upon transfer between cloud computing environments.

FIG. 2 illustrates one example of maintaining application performances upon transfer between cloud computing environments, arranged in accordance with at least some embodiments described herein.

As discussed previously, service parameters such as server processing, memory, and networking may be implemented in a wide variety of ways by different service providers. According to some example embodiments, a Cloud Computing Applicability Score (CCAS) metric may provide a quantitative value that indicates a cloud computing configuration state and its capability to provide a service level and a computing performance needed by or suitable for a customer application. The CCAS metric may enable comparison of different cloud computing environments that are capable to provide similar service level and application performances. Furthermore, the CCAS may provide a scoring scale that enables any cloud computing environment configuration to be compared to any other optional configuration. Thus, the scoring scale may be used as a tool that enables a decision to be made whether or not to migrate between cloud computing environments and for a target service provider how to allocate system resources to guarantee similar performance level. The decision may be made automatically based on predefined rules or manually by a customer.

As depicted in FIG. 2, a diagram 200 illustrates one example implementation of a migration assistance system according to some example embodiments. One or more customer applications 224 may be hosted at a source cloud computing environment 222 managed by one or more servers 220. The cloud computing environment 222 may provide a performance level for the customer applications 224 based on available and actual processing power, combination of different data storage options (local, remote, rapid access, distributed, etc.), and/or network capabilities (bandwidth, latency, uptime guarantee, etc.).

A CCAS tool 238 provided as part of a migration module, a cloud computing management application, or similar system may identify the individual metrics for the source cloud computing environment 222, compute individual scores for the metrics, and determine an overall score (CCAS) based on a weighted combination of the individual scores. The CCAS for the source cloud computing environment 222 may be used as a benchmark for the expected performance level at a target cloud computing environment 232 managed by one or more servers 230.

The CCAS for the target cloud computing environment 232 may be computed based on specifications provided by the target cloud computing environment or actual simulations run on the target cloud computing environment. It may be possible to have several options in the target system for achieving the same CCAS. If simulations are run, generic test cases may be used or, for a more accurate comparison, specific scenarios that emulate actual working conditions of the applications 226 may be used (applications 236) to determine performance levels at the target cloud computing environment 232.

Thus, maintaining application performances upon transfer between cloud computing services may start with two stages: computation of origin CCAS based on performance levels at the origin service provider (1) and computation of target CCAS options based on (simulated or expected) performance levels at the target service provider. The CCAS tool 238 may then compare the origin and target CCASs and determine if the target score matches or exceeds the source score (based upon which the migration may be started automatically). In some example embodiments, the results may be provided to a customer by a third party entity (e.g., a migration service executed on a server 228) such that the customer can make a decision on the migration.

In other example embodiments, the weighting of the individual scores for the target CCAS may be adjusted until one or more configurations are identified that match or exceed the source CCAS. In yet other example embodiments, the source and the target cloud computing environments 222 and 232 may be different sites of a service provider, and the service provider may run the CCAS tool 238 to determine if a migration of customer applications to the target site would have a negative impact on the performance levels.

Figure 3:
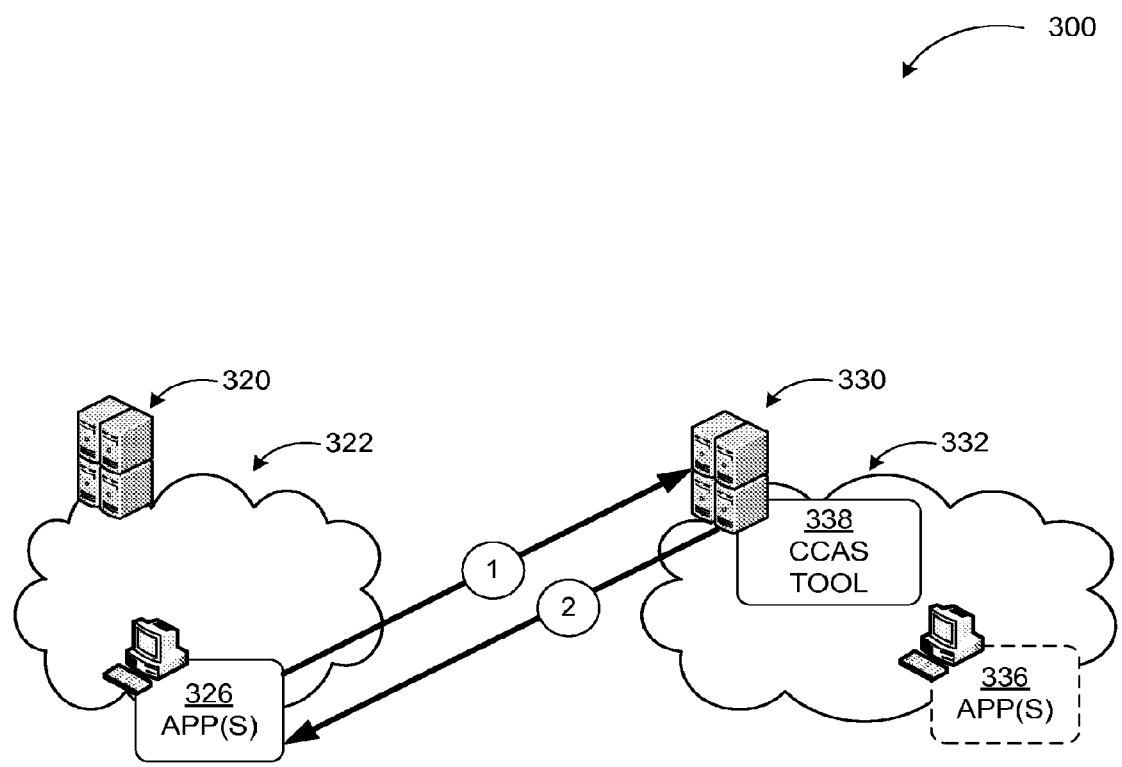
FIG. 3 illustrates another example of maintaining application performances upon transfer between cloud computing environments.

FIG. 3 illustrates another example of maintaining application performances upon transfer between cloud computing environments, arranged in accordance with at least some embodiments described herein.

A different configuration of a system for maintaining application performances is shown in a diagram 300. A source cloud computing environment 322 managed by one or more servers 320 may host applications 326. Differently from the scenario depicted in the diagram 200 of FIG. 2, a server 330 at a target cloud computing environment 332 may run a CCAS tool 338 and receive performance level information from the source cloud computing environment 322. The CCAS tool 338 may then receive performance level information (CCAS value) from its own cloud (target cloud computing environment 332) and determine if the performance level at the source cloud computing environment 322 can be matched or exceeded.

Alternatively, the CCAS tool 338 may adjust weighting values and determine one or more combinations of computing resource allocations that may be offered to the customer whose applications 336 are being migrated such that at least the same level of performance can be provided.

Figure 4:
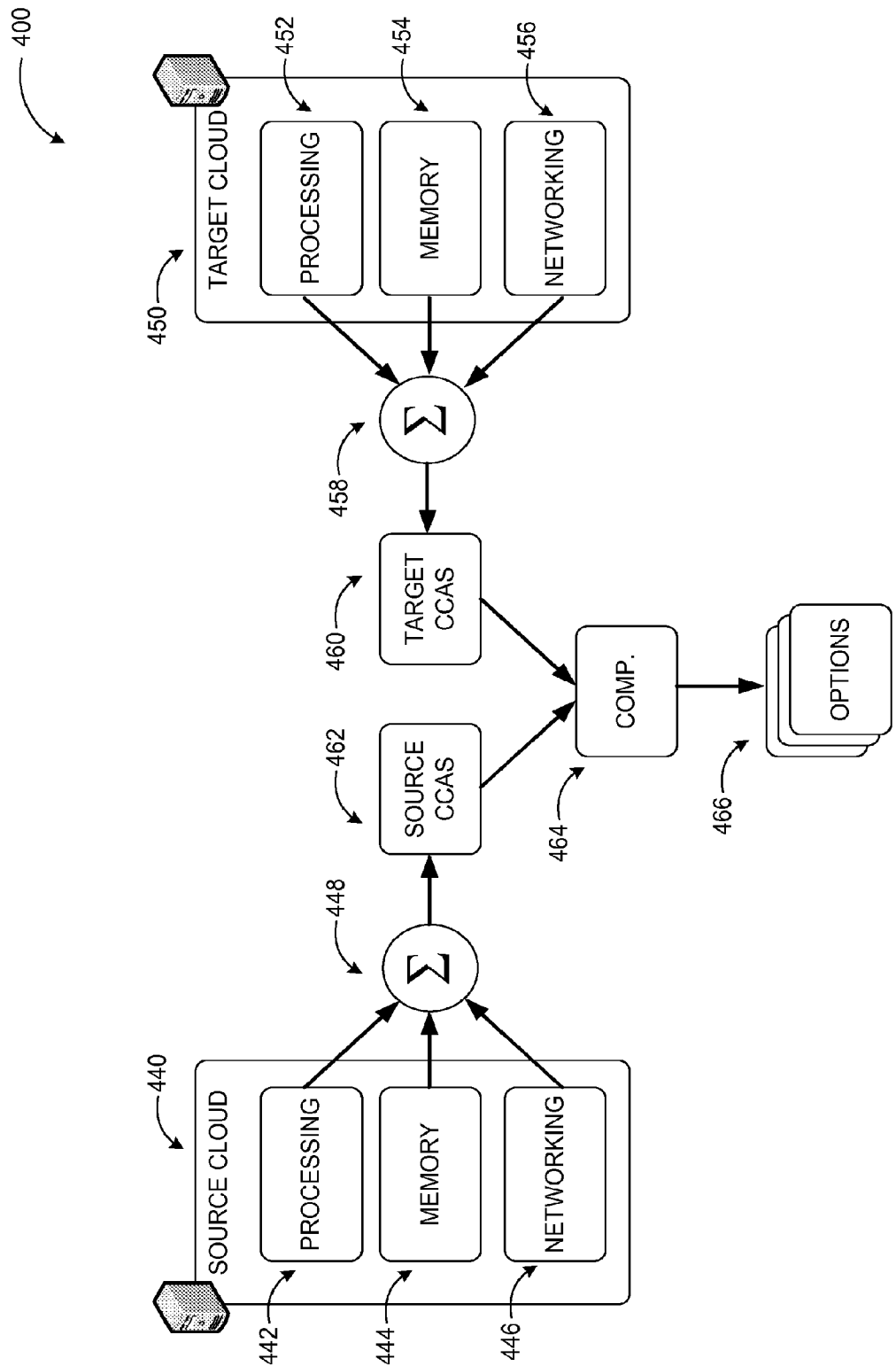
FIG. 4 illustrates conceptually how CCASs may be computed for source and target cloud computing environments and one or more options for migration determined based on CCAS comparison.

FIG. 4 illustrates conceptually how CCASs may be computed for source and target cloud computing environments and one or more options for migration determined based on CCAS comparison, arranged in accordance with at least some embodiments described herein.

As shown in a diagram 400, a migration tool, a performance management tool, or similar entity may receive a processing power 442, a memory 444, and a networking 446 scores from a source cloud 440, and combined (448) in a weighted manner resulting in a source CCAS 462. On the other side of a migration path, a processing power 452, a memory 454, and a networking 456 scores may be received from a target cloud 450, and combined (458) in a weighted manner resulting in a target CCAS 460. The source CCAS 462 and the target CCAS 460 may be compared (464) to determine whether performance levels at the target cloud 450 can match those at the source cloud 440. Because the same or similar performance levels can be provided using different resource allocations, multiple options 466 may be determined from the comparison results and offered to a customer. The options 466 may also be fed back to the target cloud 450 such that the resource allocations can be adjusted for matching the source cloud performance levels.

The performance level and, thereby, the CCAS may be determined by the cloud server computing elements—the processing power, the memory storage efficiency and the networking. Processing power parameter may depend on a type of allocated processor (there may be several types of processing cores in the computing system) and a time allocated to particular task(s) and/or application(s) by a cloud computing environment server. Memory storage parameter may focus on the influence of different types of memory elements on the processing time. For example, data storage in a cloud computing environment may include main memory (part of the DRAM that is used by a processor while executing the application), flash memory (fast available memory which may be part of the available storage), local storage (a relatively large memory/disk volume, that is locally connected to a computer that runs the application, where accessibility does not depend on the networking performances), and network memory (virtually unlimited amount of memory/disk that is located at any cloud servers, where accessibility depends directly on the networking performances). Networking parameter may be defined as the connection between the processing means of the cloud computing environment and the data that is stored in the memory storage. The networking parameter may relate to the cloud computing performance in terms of response time.

The overall metric, CCAS, may be defined based on providing a scoring scale for each cloud computing element (for which this term was not defined) and assigning for each one a weighting factor according to their effect on the application performances. Processing power parameter PR may be defined as the actual processing power (APP) used by the application, which is a fraction of the available processing power (PP) and multiplied by the processing power of the system. This parameter may be defined by the usage % and the utilized PP as:

$$PR = \Sigma APP_i / PP_i[\%] * PP_i, \qquad [1]$$

where i refers to a particular timeslot.

A server of the origin cloud computing environment may report a type of processing used (not just the server, but the actual CPU the process is running on since the system may have a heterogeneous architecture), a scheduler priority, and how many tasks are being run simultaneously. This may be used to calculate the processing power (PP). The reports may be generated every few seconds so both the average and maximum can be computed.

A different CPU may be utilized at a different time slot i. PP may be measured in MIPS—million instructions per second or predefined bench mark reports. In a heterogeneous multi-core architecture, there may be different types of cores and also specific acceleration hardware. If acceleration hardware is employed, its equivalent MIPS may be reported. The above parameters may be reported by the operating system to the CCAS tool.

In other example embodiments, the scoring parameter PR may be determined by measuring a time that takes for the existing processing resource to perform a benchmark task to the standard time that may be known for such a benchmark task. For this option, PP may be defined as the standard time and APP as the actual time spent for performing the task by the existing cloud computing environment processing resources.

Memory storage parameter (MR) may be defined as a list of parameters for each memory type. Each parameter may be defined as the percentage amount of memory of a specific type (e.g., main memory (MM), flash memory (FM), local memory (LM), and network memory (NM)) from the total amount of memory that is allocated for all memory types (TM).

$$TM = \Sigma(MM, FM, LM, NM) \quad [2]$$

The memory parameter may provide the memory allocation distribution. However, the desired memory distribution may be different for different applications. For example, an application that manages a large size database may take advantage of large local memory, whereas an application that provides optimal delivery root may prefer a larger main memory. To enable the parameter to represent how the actual memory distribution aligns with the memory distribution that may be more beneficial for the application, an additional computation may be performed. The memory distribution average may be calculated, where each type of memory has its weighting value (Mw(a)). The weighting values for each memory type may be predetermined according to the application. For example, faster memories may have higher weights.

$$MR = \frac{\sum \left(\frac{MM}{MT} \cdot MMw(a) \frac{FM}{MT} \cdot FMw(a) \cdot \frac{LM}{MT} \cdot LMw(a)\right)}{\sum (MMw(a), FMw(a), LMw(a))} \quad [3]$$

The networking performance may be divided into internal and external networking configurations. The internal networking may relate to the networking of the computing elements within the cloud computing service provider's physical and virtual infrastructure. The external networking may relate to the networking physical infrastructures that connect the customer(s) to the cloud computing service provider's physical infrastructure.

An internal networking parameter (INR) may be defined as the ratio in percentage of the actual average network bandwidth (ANBW) and the maximum bandwidth that is allocated to the specific service by the cloud computing service provider.

$$INR[\%] = \frac{ANBW}{NBW} \quad [4]$$

The external networking parameter (ENR) may be defined as the ratio in percentage of the actual average network response time (ART) and the standard response time that is expected for the same application (RTS(a)).

$$ENR[\%] = \frac{ART}{RTS(a)} \quad [5]$$

In some example embodiments, weighting levels (Nwi) and (Nwe) may be provided for internal networking and external networking capabilities, respectively, according to a specific application. The networking parameter value may be calculated as a weighted average of the value of each:

$$NR[\%] = \frac{INR \cdot Nwi + RNR \cdot Nwe}{Nwi + Nwe} \quad [6]$$

The overall score CCAS may be calculated as an average value of the parameters described in equation [1] through [6]:

$$CCAS[\%] = Average(PR, MR, NR) \quad [7]$$

In some example embodiments, an additional parameter (LR) may be used to represent a reliability score of the cloud computing environment. LR may not depend on specific applications, whereas the other parameters do.

As discussed previously, the relevancy of each parameter may be different for different applications. For example, an application that manages a large size database may probably consider the memory performance parameter as more important than the other parameters, whereas an application that enables many clients to operate simultaneously may prefer the networking performances as the most important parameter.

In order to reflect in the parameters compliance with specific client requirements, the CCAS may be computed using the above listed average may be calculated taking into consideration each parameter's weighting value (Rw(a)). The weighting values for each parameter type may be predetermined according to the application.

$$CCAS[\%] = \frac{\sum (PR \cdot PRw(a), LR \cdot LRw(a), MR \cdot MRw(a), NR \cdot NRw(a))}{\sum (PRw(a), LRw(a), MRw(a), NRw(a))} \quad [8]$$

While example embodiments are described using processing power, data storage (memory), and networking parameters in determining and comparing performance levels, embodiments are not limited to those. Example implementations may also employ server latency, storage limits or quotas, scalability factors, backup guarantees, uptime guarantees, resource usage reporting, automatic parallelization, and similar ones to determine a cloud computing applicability score using the principles described herein.

Figure 5:
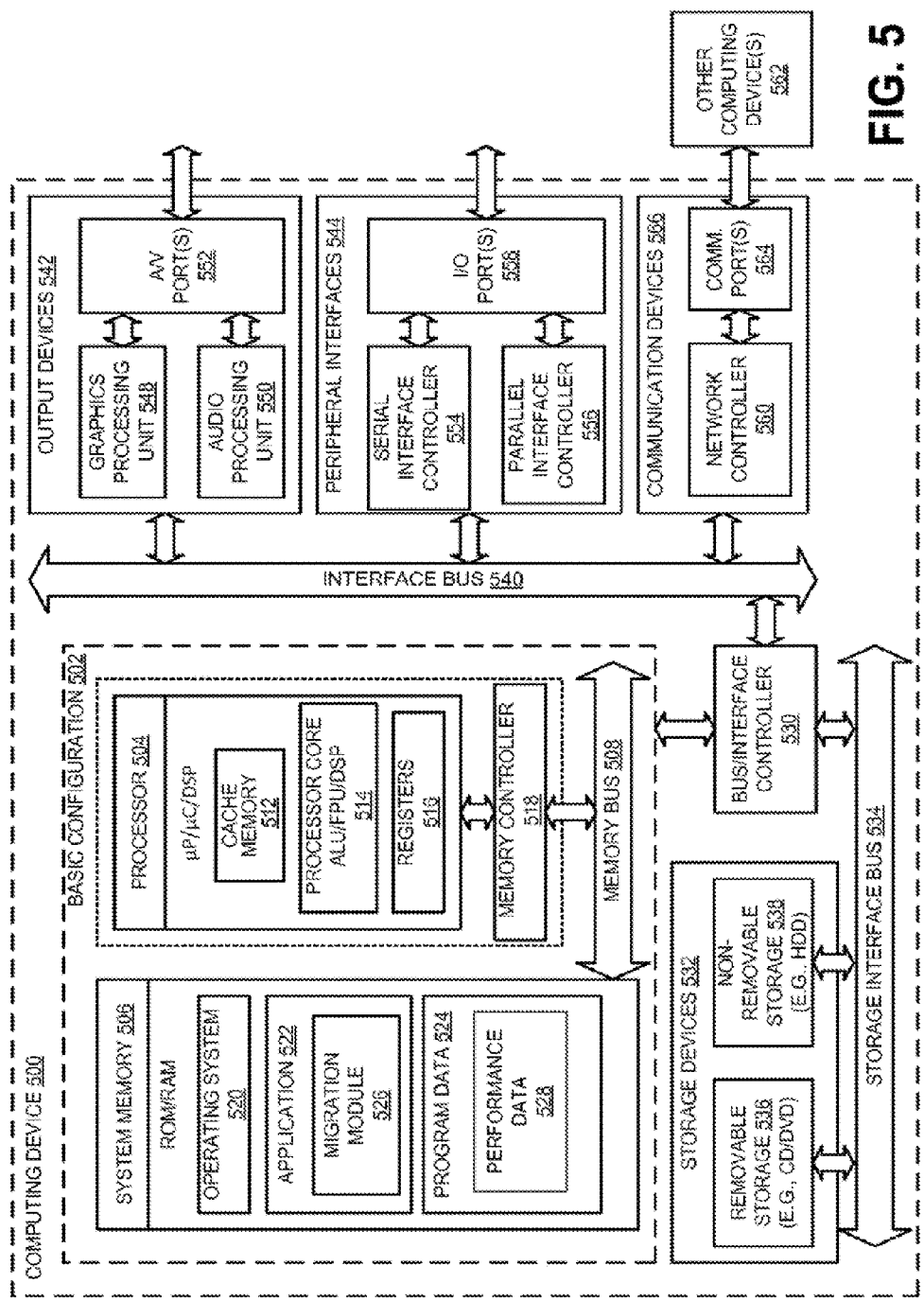
FIG. 5 illustrates a general purpose computing device, which may be used to example of maintain application performances upon transfer between cloud computing environments.

FIG. 5 illustrates a general purpose computing device 500, which may be used to example of maintain application performances upon transfer between cloud computing environments. For example, the computing device 500 may be used as servers 104, 114, or 118 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may include a cloud management application, including a migration module 526, which may determine weighted scores for individual performance levels, as well as an overall score, for a migrating application at source and target clouds as described herein. The program data 524 may include, among other data, performance data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more AN ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
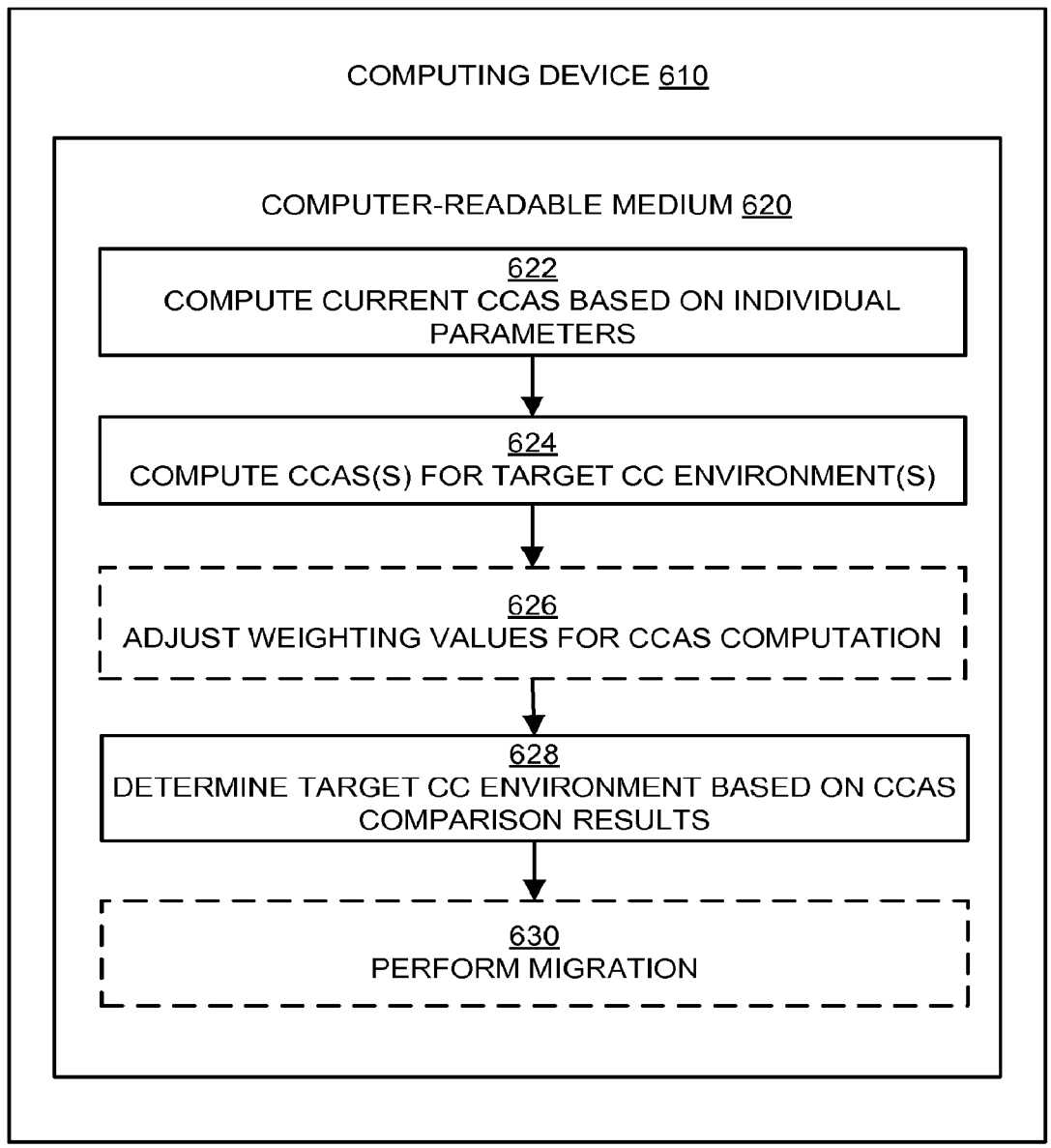
FIG. 6 is a flow diagram illustrating an example method that may be performed by a computing device such as device 500 in FIG. 5.

FIG. 6 is a flow diagram illustrating an example method that may be performed by a computing device such as the device 500 in FIG. 5, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for maintaining application performances upon transfer between cloud servers may begin with block 622, "COMPUTE CURRENT CCAS BASED ON INDIVIDUAL PARAMETERS", where a migration module or application (e.g., the migration module 526 of FIG. 5) executed on a source cloud server (e.g., the servers 104 of FIG. 1), a target cloud server (e.g., the servers 114 of FIG. 1), or a third party server (e.g., the servers 118 of FIG. 1) may compute a cloud computing applicability score for an application at a source cloud-based service provider. The score may be determined by first identifying performance parameters such as processing power, storage capacity (or memory), and network capacity (e.g., bandwidth), determining individual scores for these parameters, assigning weighting values to the individual parameters based on their influence on the system performance, and combining the weighted scores into an overall score for the source service provider.

Block 622 may be followed by block 624, "COMPUTE CCAS(S) FOR TARGET CC ENVIRONMENT(S)", where the migration module 526 may determine individual and overall scores for one or more target service providers similarly to the computation performed at block 622. Block 624 may be followed by optional block 626, "ADJUST WEIGHTING VALUES FOR CCAS COMPUTATION", where the weighting values may be adjusted in the overall score computation of one or more of the target service providers to match or exceed a current performance level at the source service provider as discussed herein.

Optional block 626 may be followed by block 628, "DETERMINE TARGET CC ENVIRONMENT BASED ON CCAS COMPARISON RESULTS", where the migration module 526 may determine one or more suitable target service providers for migrating the application to and enable the customer to select among multiple target service providers or service packages. In other embodiments, the process may be used to determine an optimum mixture of service parameters at a single target service provider or verify performance level matching for a site-to-site transfer within one service provider. Block 628 may be followed by optional block 630, "PERFORM MIGRATION", where the migration may be performed to the target service provider or site based on the determination made using the CCAS(s) as discussed herein.

The blocks included in the above described process are for illustration purposes. Maintaining application performances upon transfer between cloud servers may be implemented by similar processes with fewer or additional blocks. In some examples, the blocks may be performed in a different order. In some other examples, various blocks may be eliminated. In still other examples, various blocks may be divided into additional blocks, or combined together into fewer blocks.

Figure 7:
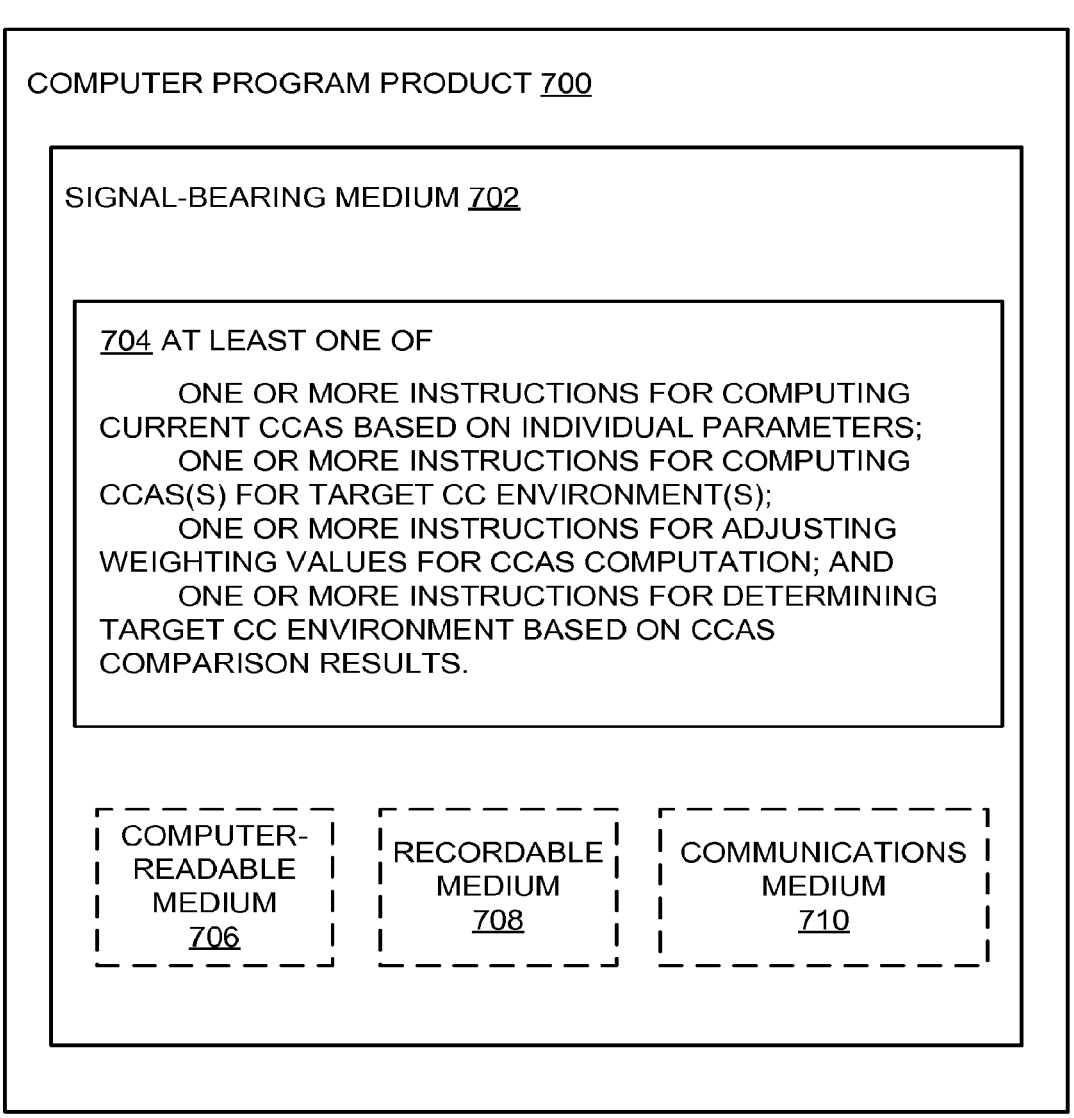
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the migration module 526 may undertake one or more of the tasks shown in FIG. 7 in response to the instructions 704 conveyed to the processor 504 by the medium 702 to perform actions associated with maintaining application performances upon transfer between cloud servers as described herein. Some of those instructions may include, for example, instructions for computing current CCAS based on individual parameters, computing CCAS(s) for target cloud computing environment(s), adjusting weighting values for CCAS computation, and determining target cloud computing environment based on CCAS comparison results according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for maintaining application performances upon transfer between cloud computing environments may include determining a plurality of performance metrics associated with a customer application in a source cloud computing environment; computing a plurality of performance parameters based on the performance metrics associated with the customer application in the source cloud computing environment; combining the plurality of performance parameters to a source Cloud Computing Applicability Score (CCAS) in a weighted manner; and adapting a target cloud computing environment for the customer application based on the source CCAS.

According to other embodiments, the performance metrics may include a processing power metric, a memory metric, and a networking metric, and the method may include computing the processing power metric based on an actual processing power consumed by the customer application as a fraction of available processing power. The processing power metric may be further based on one or more of a type of processing, a scheduler priority, and a number of tasks being executed simultaneously. The processing power metric may be averaged over a predefined period. The method may also computing the memory metric based on a weighted combination of allocated memory types for the customer application, where the memory types include one or more of a main memory, a flash memory, a local memory, and a network memory.

According to further examples, the allocated memory types may represent an actual allocation at the source cloud computing environment averaged over a predefined period. Faster memory types may be assigned higher weighting values relative to slower memory types. The networking metric may include an internal networking metric based on a ratio of consumed network bandwidth and an allocated network bandwidth within the source cloud computing environment and an external networking parameter based on a ratio of actual network response time and a standard expected network response time for communications between a service provider of the source cloud computing environment and the customer. The internal networking metric and the external networking metric may be combined in a weighted manner and averaged over a predefined period.

According to yet other examples, selecting the target cloud computing environment may include determining a plurality of performance metrics associated with the customer application in the target cloud computing environment; computing a plurality of performance parameters based on the performance metrics associated with the customer application in the target cloud computing environment; combining the plurality of performance parameters to a target CCAS in a weighted manner; and comparing the source CCAS and the target CCAS. The performance metrics in the target cloud computing environment may be determined based on a simulation and the performance parameters in the source and target cloud computing environments may further include a reliability parameter representing a reliability factor associated with each environment.

According to yet further examples, the performance metrics in the target cloud computing environment may be weighted based on customer desired performance at the target cloud computing environment. The method may also include computing the target CCAS following a migration of the customer application to the target cloud computing environment to verify performance at the target cloud computing environment. The method may further include computing the target CCAS for a plurality of target cloud computing environments; providing the customer with a plurality of candidate cloud computing environment offers; computing the target CCAS for a plurality of target cloud computing environment configurations based on distinct weighting factors; and providing the customer with a plurality of target cloud computing environment package offers. The performance metrics may be determined for a plurality of customer applications and the weighting may be determined based on individual customer applications. The method may include normalizing the performance parameters, where the performance parameters are normalized as a percentage.

According to other examples, a computing device for maintaining application performances upon transfer between cloud computing environments may include a memory configured to store instructions and a processing unit configured to execute a migration module in conjunction with the instructions. The migration module may determine a plurality of performance metrics associated with a customer application in a source cloud computing environment; compute a plurality of performance parameters based on the performance metrics associated with the customer application in the source cloud computing environment; combine the plurality of performance parameters to a source Cloud Computing Applicability Score (CCAS) in a weighted manner; and adapt a target cloud computing environment for the customer application based on the source CCAS.

According to some examples, the performance metrics may include a processing power metric, a memory metric, and a networking metric. The migration module may also compute the processing power metric based on an actual processing power consumed by the customer application as a fraction of available processing power. The processing power metric may be further based on one or more of a type of processing, a scheduler priority, and a number of tasks being executed simultaneously. The processing power metric may be averaged over a predefined period. The migration module may further compute the memory metric based on a weighted combination of allocated memory types for the customer application, where the memory types include one or more of a main memory, a flash memory, a local memory, and a network memory. The allocated memory types may represent an actual allocation at the source cloud computing environment averaged over a predefined period, where faster memory types may be assigned higher weighting values relative to slower memory types.

According to further examples, the networking metric may include an internal networking metric based on a ratio of consumed network bandwidth and an allocated network bandwidth within the source cloud computing environment and an external networking parameter based on a ratio of actual network response time and a standard expected network response time for communications between a service provider of the source cloud computing environment and the customer. The internal networking metric and the external networking metric may be combined in a weighted manner and averaged over a predefined period. The migration module may select the target cloud computing environment by determining a plurality of performance metrics associated with the customer application in the target cloud computing environment; computing a plurality of performance parameters based on the performance metrics associated with the customer application in the target cloud computing environment; combining the plurality of performance parameters to a target CCAS in a weighted manner; and comparing the source CCAS and the target CCAS.

According to yet other examples, the performance metrics in the target cloud computing environment may be determined based on a simulation. The performance parameters in the source and target cloud computing environments may further include a reliability parameter representing a reliability factor associated with each environment. The performance metrics in the target cloud computing environment may be weighted based on customer desired performance at the target cloud computing environment. The migration module may also compute the target CCAS following a migration of the customer application to the target cloud computing environment to verify performance at the target cloud computing environment.

According to yet other examples, the migration module may compute the target CCAS for a plurality of target cloud computing environments and provide the customer with a plurality of candidate cloud computing environment offers. The migration module may further compute the target CCAS for a plurality of target cloud computing environment configurations based on distinct weighting factors and provide the customer with a plurality of target cloud computing environment package offers. The performance metrics may be determined for a plurality of customer applications and the weighting may be determined based on individual customer applications. The migration module may also normalize the performance parameters, where the performance parameters are normalized as a percentage.

According to further examples, a computer-readable storage medium may have instructions stored thereon for maintaining application performances upon transfer between cloud computing environments. The instructions may include determining a plurality of performance metrics associated with a customer application in a source cloud computing environment; computing a plurality of performance parameters based on the performance metrics associated with the customer application in the source cloud computing environment; combining the plurality of performance parameters to a source Cloud Computing Applicability Score (CCAS) in a weighted manner; and adapting a target cloud computing environment for the customer application based on the source CCAS.

According to other embodiments, the performance metrics may include a processing power metric, a memory metric, and a networking metric, and the instructions may include computing the processing power metric based on an actual processing power consumed by the customer application as a fraction of available processing power. The processing power metric may be further based on one or more of a type of processing, a scheduler priority, and a number of tasks being executed simultaneously. The processing power metric may be averaged over a predefined period. The instructions may also computing the memory metric based on a weighted combination of allocated memory types for the customer application, where the memory types include one or more of a main memory, a flash memory, a local memory, and a network memory.

According to further examples, the allocated memory types may represent an actual allocation at the source cloud computing environment averaged over a predefined period. Faster memory types may be assigned higher weighting values relative to slower memory types. The networking metric may include an internal networking metric based on a ratio of consumed network bandwidth and an allocated network bandwidth within the source cloud computing environment and an external networking parameter based on a ratio of actual network response time and a standard expected network response time for communications between a service provider of the source cloud computing environment and the customer. The internal networking metric and the external networking metric may be combined in a weighted manner and averaged over a predefined period.

According to yet other examples, selecting the target cloud computing environment may include determining a plurality of performance metrics associated with the customer application in the target cloud computing environment; computing a plurality of performance parameters based on the performance metrics associated with the customer application in the target cloud computing environment; combining the plurality of performance parameters to a target CCAS in a weighted manner; and comparing the source CCAS and the target CCAS. The performance metrics in the target cloud computing environment may be determined based on a simulation and the performance parameters in the source and target cloud computing environments may further include a reliability parameter representing a reliability factor associated with each environment.

According to yet further examples, the performance metrics in the target cloud computing environment may be weighted based on customer desired performance at the target cloud computing environment. The instructions may also include computing the target CCAS following a migration of the customer application to the target cloud computing environment to verify performance at the target cloud computing environment. The instructions may further include computing the target CCAS for a plurality of target cloud computing environments; providing the customer with a plurality of candidate cloud computing environment offers; computing the target CCAS for a plurality of target cloud computing environment configurations based on distinct weighting factors; and providing the customer with a plurality of target cloud computing environment package offers. The performance metrics may be determined for a plurality of customer applications and the weighting may be determined based on individual customer applications. The instructions may include normalizing the performance parameters, where the performance parameters are normalized as a percentage.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to maintain application performances upon transfer between cloud computing environments, the method comprising:

determining a plurality of performance metrics associated with a customer application in a source cloud computing environment;

computing a plurality of performance parameters based on the performance metrics associated with the customer application in the source cloud computing environment;

combining the plurality of performance parameters to a source Cloud Computing Applicability Score (CCAS) in a weighted manner;

determining whether a target CCAS matches or exceeds the source CCAS, wherein the target CCAS is a weighted combination of a plurality of performance parameters computed based on performance metrics associated with the customer application in a target cloud computing environment; and in response to a determination that the target CCAS matches or exceeds the source CCAS, automatically migrating the customer application to the target cloud computing environment; else adapting the target cloud computing environment for the customer application such that the target CCAS matches or exceeds the source CCAS by adjusting a weighting of one or more of the plurality of performance parameters for the target CCAS prior to the migration of the customer application to the target computing environment.

2. The method according to claim 1, wherein the performance metrics associated with the customer application in the source and the target cloud computing environments include a processing power metric, a memory metric, and a networking metric.

3. The method according to claim 2, further comprising:
computing the processing power metric based on an actual processing power consumed by the customer application as a fraction of available processing power.

4. The method according to claim 3, wherein the processing power metric is further based on one or more of a type of processing, a scheduler priority, and a number of tasks being executed simultaneously.

5. The method according to claim 4, wherein the processing power metric is averaged over a predefined period.

6. The method according to claim 3, further comprising:
computing the memory metric based on a weighted combination of allocated memory types for the customer application, wherein the memory types include one or more of a main memory, a flash memory, a local memory, and a network memory.

7. The method according to claim 6, wherein the allocated memory types represent an actual allocation at the source cloud computing environment averaged over a predefined period.

8. The method according to claim 6, wherein faster memory types are assigned higher weighting values relative to slower memory types.

9. A computing device to maintain application performances upon transfer between cloud computing environments, the computing device comprising:
a memory configured to store instructions; and
a processor coupled to the memory, wherein the processor is configured to:
determine a plurality of performance metrics associated with a customer application in a source cloud computing environment;
compute a plurality of performance parameters based on the performance metrics associated with the customer application in the source cloud computing environment;
combine the plurality of performance parameters to a source Cloud Computing Applicability Score (CCAS) in a weighted manner;
determine whether a target CCAS matches or exceeds the source CCAS, wherein the target CCAS is a weighted combination of a plurality of performance parameters computed based on performance metrics associated with the customer application in a target cloud computing environment; and
in response to a determination that the target CCAS matches or exceeds the source CCAS, automatically migrate the customer application to the target cloud computing environment; else
adapt a target cloud computing environment for the customer application such that the target CCAS matches or exceeds the source CCAS by adjusting a weighting of one or more of the plurality of performance parameters for the target CCAS prior to the migration of the customer application to the target computing environment.

10. The computing device according to claim 9, wherein the performance metrics associated with the customer application in the target cloud computing environment are determined based on a simulation.

11. The computing device according to claim 9, wherein the performance parameters computed based on the performance metrics associated with the customer application in the source and target cloud computing environments further include a reliability parameter representing a reliability factor associated with each environment.

12. The computing device according to claim 9, wherein the performance metrics associated with the customer application in the target cloud computing environment are weighted based on customer desired performance at the target cloud computing environment.

13. The computing device according to claim 9, wherein the processor is further configured to:
compute the target CCAS following the migration of the customer application to the target cloud computing environment to verify performance at the target cloud computing environment.

14. The computing device according to claim 9, wherein the processor is further configured to:
compute the target CCAS for a plurality of target cloud computing environments; and
provide a customer with a plurality of candidate cloud computing environment offers.

15. The computing device according to claim 9, wherein the processor is further configured to:
compute the target CCAS for a plurality of target cloud computing environment configurations based on distinct weighting factors; and
provide a customer with a plurality of target cloud computing environment package offers.

16. A non-transitory computer-readable storage medium with instructions stored thereon to maintain application performances upon transfer between cloud computing environments, the instructions comprising:
determining a plurality of performance metrics associated with a customer application in a source cloud computing environment;
computing a plurality of performance parameters based on the performance metrics associated with the customer application in the source cloud computing environment;
combining the plurality of performance parameters to a source Cloud Computing Applicability Score (CCAS) in a weighted manner;
determining whether a target CCAS matches or exceeds the source CCAS, wherein the target CCAS is a weighted combination of a plurality of performance parameters computed based on performance metrics associated with the customer application in a target cloud computing environment; and
in response to a determination that the target CCAS matches or exceeds the source CCAS, automatically migrating the customer application to the target cloud computing environment; else
adapting a target cloud computing environment for the customer application such that the target CCAS matches or exceeds the source CCAS by adjusting a weighting of one or more of the plurality of performance parameters for the target CCAS prior to the migration of the customer application to the target computing environment.

17. The non-transitory computer-readable storage medium according to claim 16, wherein the performance metrics associated with the customer application in the source and target cloud computing environments include a processing power metric, a memory metric, and a networking metric.

18. The non-transitory computer-readable storage medium according to claim 16, wherein the performance metrics associated with the customer application in the source and target cloud computing environments are determined for a plurality of customer applications and the weighting is determined based on individual customer applications.

19. The non-transitory computer-readable storage medium according to claim 16, wherein the instructions further comprise:
normalizing the performance parameters computed based on the performance metrics associated with the customer application in the source and target cloud computing environments.

20. The non-transitory computer-readable storage medium according to claim 19, wherein the performance parameters computed based on the performance metrics associated with the customer application in the source and target cloud computing environments are normalized as a percentage.

\* \* \* \* \*